(12) United States Patent
Liu et al.

(10) Patent No.: US 9,040,204 B1
(45) Date of Patent: May 26, 2015

(54) RECONFIGURABLE MICROBIAL FUEL CELL

(71) Applicants: Wayne P. Liu, San Diego, CA (US); David Bartholomew Chadwick, San Diego, CA (US); Kenneth E. Richter, San Diego, CA (US); Adriane Q. Wotawa-Bergen, San Diego, CA (US); Jeffrey Asher Kagan, San Diego, CA (US)

(72) Inventors: Wayne P. Liu, San Diego, CA (US); David Bartholomew Chadwick, San Diego, CA (US); Kenneth E. Richter, San Diego, CA (US); Adriane Q. Wotawa-Bergen, San Diego, CA (US); Jeffrey Asher Kagan, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 86 days.

(21) Appl. No.: 13/773,342

(22) Filed: Feb. 21, 2013

(51) Int. Cl.
*H01M 8/16* (2006.01)
*H01M 8/04* (2006.01)

(52) U.S. Cl.
CPC ............ *H01M 8/16* (2013.01); *H01M 8/04313* (2013.01); *H01M 8/04671* (2013.01)

(58) Field of Classification Search
CPC ..... H01M 8/00; H01M 8/16; H01M 8/04313; H01M 8/04671
USPC .......... 429/401, 422, 427, 430, 431, 432, 452
See application file for complete search history.

(56) References Cited

U.S. PATENT DOCUMENTS

| | | | |
|---|---|---|---|
| 2010/0119879 A1* | 5/2010 | Girguis et al. .................... | 429/2 |
| 2010/0239920 A1 | 9/2010 | Sefton | |
| 2012/0064416 A1* | 3/2012 | Chang et al. .................. | 429/401 |
| 2013/0076145 A1* | 3/2013 | Kim et al. ....................... | 307/77 |

OTHER PUBLICATIONS

Hongwei Gao, Andrew Meehan, and Zbigniew Lewandowski; New Microbial Fuel Cell Power System for Efficiency Improvement; Electrical Machines and Systems (ICEMS), 2011 International Conference; Aug. 20-23, 2011.
Andrew Meehan, Hongwei Gao, Senior Member, IEEE, and Zbigniew Lewandowski; Energy Harvesting With Microbial Fuel Cell and Power Management System; IEEE Transactions on Power Electronics, vol. 26, No. 1; Jan. 2011.
Jae-Do Park and Zhiyong Ren; High efficiency energy harvesting from microbial fuel cells using a synchronous boost converter; Journal of Power Sources 208 (2012) 322-327; Feb. 20, 2012.
Avinash Shantaram; Power Management for Microbial Fuel Cells; Masters Thesis, Montana State University; Apr. 2005.
K. E, Richter and A. Q. Wotawa-Bergen; Predicting in situ Sediment Fuel Cell Potential; OCEANS 2011; Sep. 19-22, 2011.

\* cited by examiner

*Primary Examiner* — Patrick Ryan
*Assistant Examiner* — Ben Lewis
(74) *Attorney, Agent, or Firm* — SPAWAR Systems Center Pacific; Kyle Eppele; J. Eric Anderson

(57) ABSTRACT

A microbial fuel cell comprising: a first cathode; at least two anodes electrically connected to each other and to the cathode in a reconfigurable manner; and a processor operatively coupled to the anodes and configured to monitor a parameter of each anode to determine if a given anode has been oxygen-contaminated, and further configured to convert an oxygen-contaminated anode into a second cathode by reconfiguring the electrical connections.

13 Claims, 9 Drawing Sheets

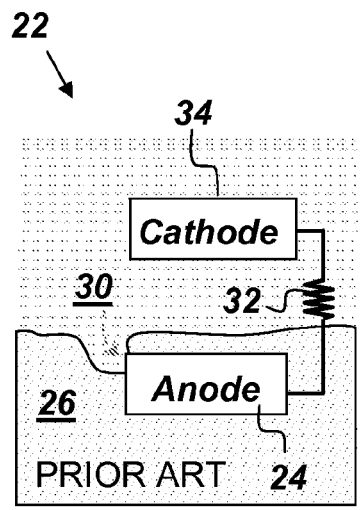
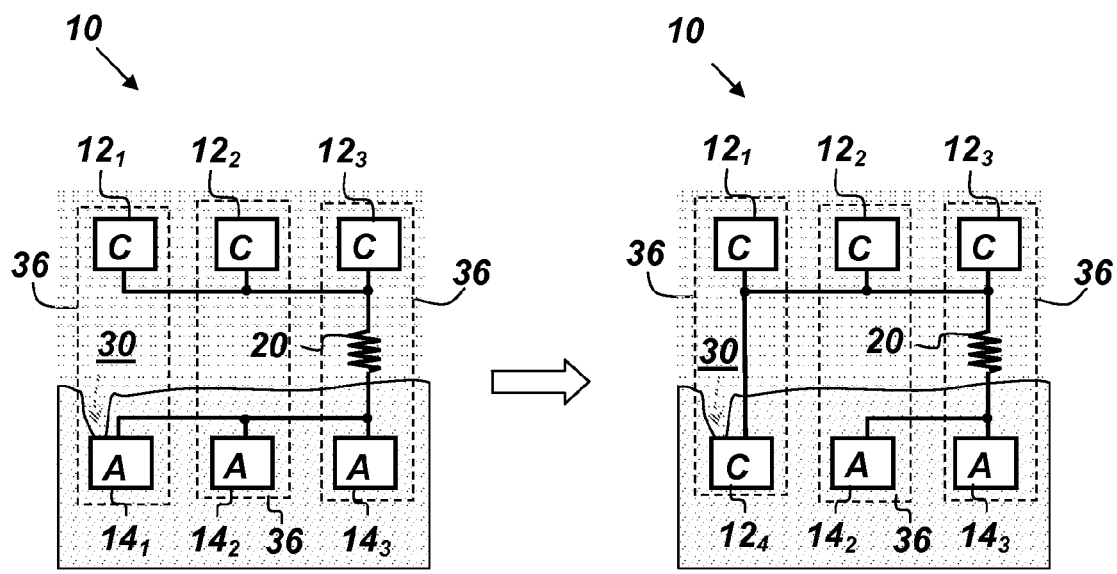
Fig. 3A
Fig. 3B
Fig. 3C

RECONFIGURABLE MICROBIAL FUEL CELL

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; sscpac_t2@navy.mil. Reference Navy Case Number 101490.

BACKGROUND OF THE INVENTION

This invention relates to the field of microbial fuel cells (MFCs). When an MFC is deployed in its intended operating environment, changes in the environmental conditions over time may cause detrimental fluctuations in the MFC's power output. A need exists for an improved MFC.

SUMMARY

Disclosed herein is a microbial fuel cell comprising: a first cathode, at least two anodes, and a processor. The anodes are electrically connected to each other and to the cathode in a reconfigurable manner. The processor is operatively coupled to the anodes and configured to monitor a parameter of each anode to determine if a given anode has been oxygen-contaminated. The processor is also configured to convert an oxygen-contaminated anode into a second cathode by reconfiguring the electrical connections.

Another embodiment of a microbial fuel cell is also disclosed herein comprising: an array of elements and a processor. Each element comprises a cathode exposed to a first environment, an anode exposed to a second environment, and an electrical load electrically connected between the cathode and the anode. The second environment has a lower concentration of oxygen than the first environment, and the components of each element and the elements themselves are electrically connected to each other in a reconfigurable manner. The processor is operatively coupled to each element and configured to monitor a parameter of each element to determine if a given element's anode has been oxygen-contaminated, and further configured to convert an oxygen-contaminated anode into an additional cathode by reconfiguring the electrical connections. The anode of each element is disposed within an open container positioned in the second environment such that the open container's opening faces away from the first environment. The container is constructed of oxygen-impermeable material.

BRIEF DESCRIPTION OF THE DRAWINGS

FIG. 3A is an illustration depicting oxygen intrusion to the anode of a prior art MFC.

FIGS. 3B-3C are illustrations depicting oxygen intrusion to one of the anodes of a reconfigurable MFC.

Throughout the several views, like elements are referenced using like references. The elements in the figures are not drawn to scale and some dimensions are exaggerated for clarity.

DETAILED DESCRIPTION OF EMBODIMENTS

Figure 1:
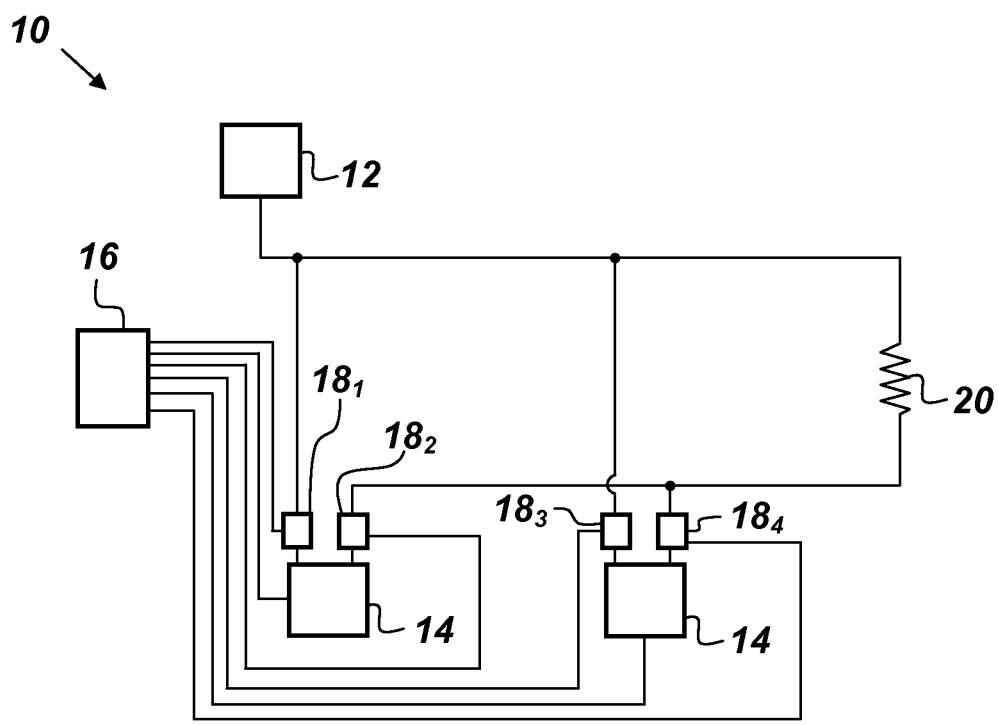
FIG. 1 is an illustration of a reconfigurable microbial fuel cell (MFC).

FIG. 1 portrays an embodiment of a reconfigurable microbial fuel cell (MFC) 10. The reconfigurable MFC 10 comprises a first cathode 12, at least two anodes 14, and a processor 16. The anodes 14 are electrically connected to each other and to the cathode 12 in a reconfigurable manner. The processor 16 is operatively coupled to the anodes 14 and is configured to monitor a parameter of each anode 14 to determine if a given anode 14 has been oxygen-contaminated. The processor 16 is further configured to convert an oxygen-contaminated anode 14 into a second cathode 12 by reconfiguring the electrical connections between the anodes 14 and the cathode 12. Thus, as environmental conditions around the reconfigurable MFC 10 change over time, the processor 16—through reconfiguring the electrical connections between the anodes and cathode—can control the electrical power output of the reconfigurable MFC 10.

The cathode 12 may be made of any material, and may have any shape, that offers a path for electron transfer to an oxygen containing media such as seawater. The cathode 12 can be shaped or sized to any desired form factor. Suitable examples of cathode material include, but are not limited to, carbon cloth, graphite chips/plates, graphite rods, graphite adhesives or coatings, graphite or carbon brush, activated carbon granules, and platinum materials. The anode 14 may be sized, shaped, formed, and/or positioned to provide exposure to the nutrient-rich media. The anode 14 may be constructed of any material capable of receiving electrons from the surrounding media. Suitable examples of anode material include, but are not limited to, carbon cloth, graphite chips/plates, graphite rods, graphite adhesives or coatings, graphite or carbon brush, activated carbon granules, and platinum materials. The MFC 10 may thus take many forms of construct and may also make use of special additives or coatings (mediators) that facilitate electron transfer between anode and microbes or additives that promote or accelerate microbial growth. The MFC 10 allows anode and cathode functions to be switched, ganged or manipulated to control power output.

Figure 2A:
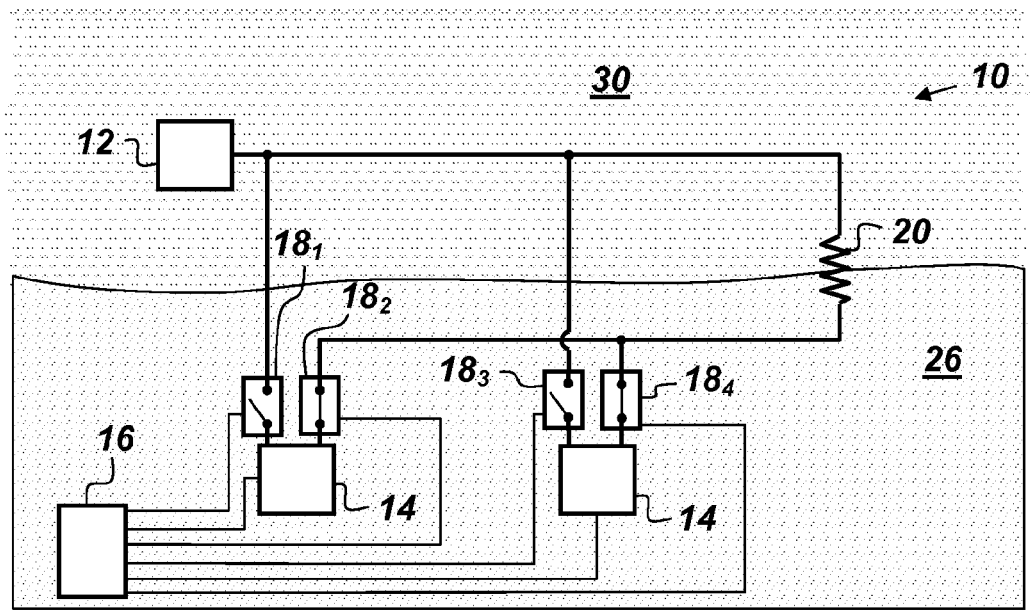
FIG. 2A is an illustration of a reconfigurable MFC in a marine environment.

The processor 16 may be any device capable of monitoring a parameter of the anode 14 and reconfiguring electrical connections in response to a change in that parameter. Suitable examples of the processor 16 include, but are not limited to, a microprocessor, a cell phone, an analog-digital (A/D) converter, and a multiplexer. The processor 16 may reconfigure the electrical connections between the various elements of the MFC 10 through any means which are capable of electrically disconnecting an anode and an oxygen-contaminated anode and capable of establishing a direct electrical connection between the oxygen-contaminated anode and the cathode. For example, the reconfigurable MFC 10 may comprise a plurality of processor-controlled switches $18_1$-$18_4$, such as are depicted in FIG. 1. In one embodiment, the processor 16 may comprise self-triggering switches such as transistors or sensor-based switches which do not rely on external processor control. Under non-oxygen-contaminated conditions, switches $18_1$ and $18_3$ may remain open and switches $18_2$ and $18_4$ may remain closed—creating a circuit where the two anodes 14 are connected with the cathode 12 via an electrical load 20, such as is shown in FIG. 2A. The processor 16 can convert any given anode 14 into another cathode 12 by adjusting the open/closed states of the various switches 18. An example of such a conversion is described below and illustrated in FIGS. 3A-3C. The electrical load 20 may be any electrical load which draws power from the reconfigurable MFC 10. Suitable examples of the electrical load 20 include, but are not limited to, a battery, a capacitor, a resistor, a motor, a sensor, a communication device, a light source, and a processor.

Figure 2B:
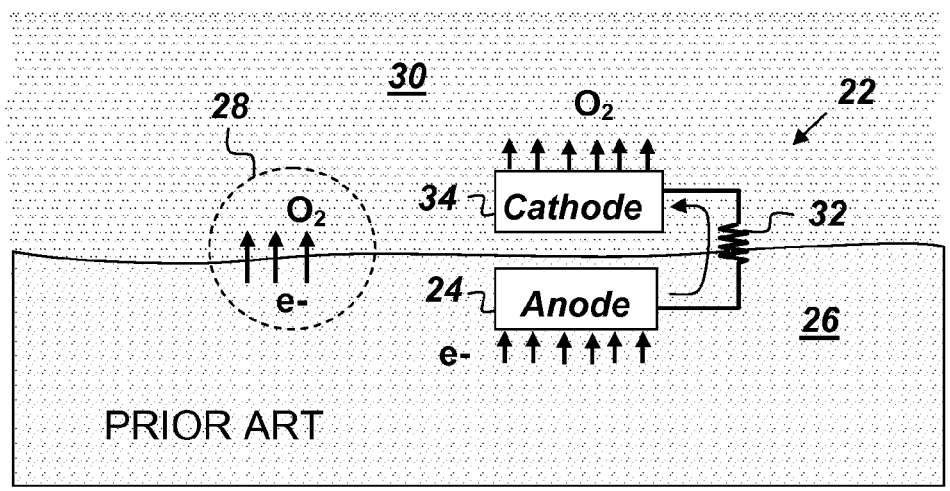
FIG. 2B is an illustration depicting a prior art MFC in a marine environment.

FIGS. 2A-2B are illustrations depicting the reconfigurable MFC 10 and a prior-art MFC 22 respectively in a marine environment. FIG. 2A shows a two-anode embodiment of the reconfigurable MFC 10 in a marine environment comprised of water 30 and sea-bed sediment 26. However it is to be understood that the reconfigurable MFC 10 is not limited to operation in marine environments, but is equally suitable for any liquid, ground or atmospheric interfaces where a relatively low-oxygen environment is separated from a relatively oxygen-rich environment. Further suitable examples of environments in which the MFC 10 may be used include, but are not limited to wastewater treatment platforms, lab automations that autonomously evaluate output versus programmed inputs, MFC powered vehicles, buoys, and inpipe sensor platforms. The basic operating principles of the anodes 14 and the cathode 12 of the reconfigurable MFC 10 are the same as anode and cathode structures of the prior art MFC 22 of FIG. 2B. MFC 22 uses an anode structure 24 buried in sea-bed sediment 26 to capture free electrons generated when anaerobic or facultative anaerobic bacteria metabolize sediment-based nutrients. Anode 24 resides in an anaerobic (oxygen-free) medium (i.e., the sea-bed sediment 26). The free electrons (e−) of the metabolized sediment require a terminal electron acceptor shown generally within circle 28, such as dissolved oxygen ($O_2$) present in water 30, to facilitate the microbial fuel cell process. Anode 24 is inserted in place of naturally occurring electron acceptors and is used to harvest the flow of electrons. The captured electrons are then passed through an electrical load 32 en route to a cathode structure 34 for release to sources of dissolved oxygen in the water 30. The seawater 30 and marine sediment 26 make up a microbial environment suitable for microbial fuel cell operation.

FIGS. 3A-3C are illustrations depicting various scenarios where an anode in an MFC becomes oxygen-compromised or inoperative. FIG. 3A depicts the prior-art MFC 22 in a condition where water 30 has penetrated the sediment 26 to where the anode structure 24 is located, resulting in oxygen intrusion or leakage into the anaerobic region (i.e., sediment 26). In this scenario, the water 30 out-competes the anode structure 24 as an electron acceptor and thus, shorts-out, or denies electron flow to, the electrical load 32. In contrast, to regulate power output, the MFC 10 shown in FIG. 3B can be subdivided into a plurality of elements 36, each element 36 comprising a cathode 12 and an anode 14, which can be autonomously monitored and dynamically resized, aggregated, and/or disbanded by the processor 16 enabling the MFC 10 to adapt to time-varying environmental and operating conditions. The parameter monitored by the processor 16 may be any performance characteristic of an anode. Suitable examples of parameters of a given anode 14 which the processor 16 may monitor include, but are not limited to, a voltage output by the anode, an electrical current output by the anode, and the anode's electrical resistance.

FIG. 3B depicts an embodiment of the reconfigurable MFC 10 comprising an array of anodes $14_1$-$14_3$, wherein anode $14_1$ has been contaminated with oxygen from the water 30. If left unchanged, the oxygen contamination of anode $14_1$ would short-out the MFC 10. However, the processor 16 is configured to identify the compromised anode $14_1$ by monitoring a parameter of each of the anodes 14 and then configured to convert the anode $14_1$ into an additional cathode $12_4$, as shown in FIG. 3C, by reconfiguring the electrical connections between the various elements. This results in prolonged life of the MFC 10 and increased ion (H+) exchange and power production.

Figure 4A:
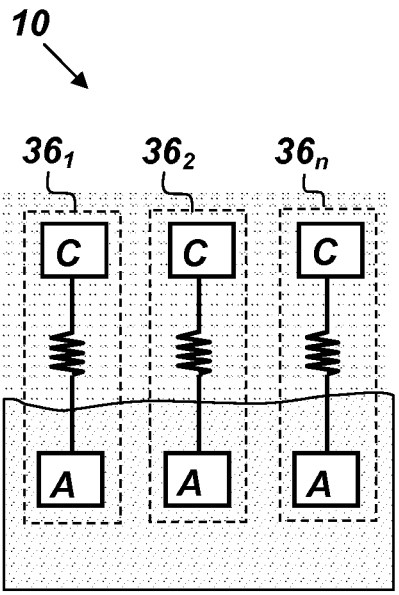
FIGS. 4A-4B are illustrations of an embodiment of the reconfigurable MFC.
Figure 4B:
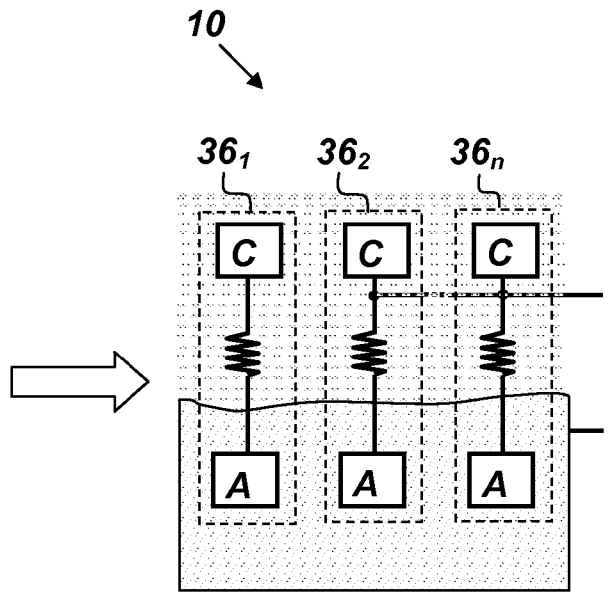

FIGS. 4A-4B illustrate another embodiment of the MFC 10, showing how the processor 16 may be used to autonomously control the power output of the MFC 10. In FIG. 4A, the MFC 10 comprises an array of discrete elements $36_1$ through $36_n$, where n is an index. The processor 16 may be configured to autonomously (i.e., without human involvement) reconfigure the electrical wiring between the elements and components within each element (e.g., in parallel or series with other MFC elements, resistors, capacitors, inductors, etc.) to control the anode size and desired performance parameters. In other words, the processor 16 may be configured to dynamically subdivide and reconfigure MFC 10 by aggregating, disbanding or placing in parallel (or series) any number of elements 36. An example of such a reconfiguration of the MFC 10 elements is provided in FIG. 4B. For each unique configuration, the processor 16 may evaluate the resulting voltage, power density, and/or anode size relationships to determine desired operating lineups. Autonomous reconfiguration of MFC 10 elements (e.g., isolating, arraying, aggregating, disbanding, placing in parallel or serial) allows the MFC 10 to respond to dynamic environmental and operational conditions. The ability of the MFC 10 to isolate oxygen exposure to an anode area by autonomously switching a compromised anode to function as an oxygen seeking cathode enables the MFC 10 to heal itself in the event of fatal oxygen intrusion to the anode area.

Figure 4C:
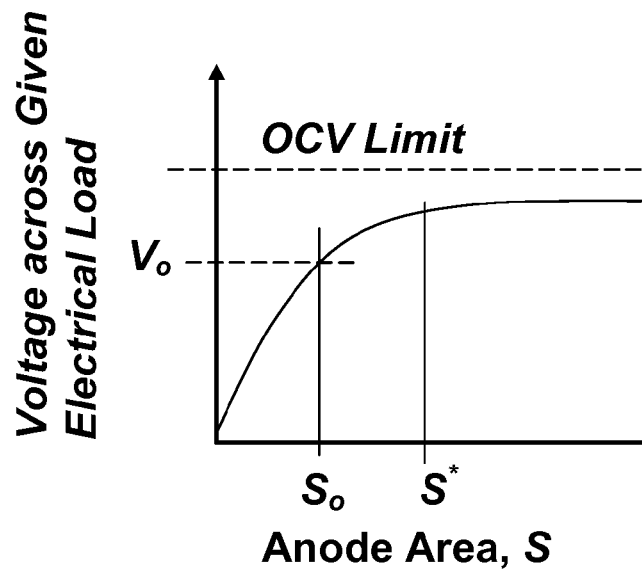
FIG. 4C is a plot of the total anode area of a reconfigurable MFC with respect to the voltage across an electrical load.

FIG. 4C is a plot of the total anode area S of the MFC 10 with respect to the voltage V across the electrical load 20. MFC voltage across an electrical load generally increases with anode area S when non-cathode limited. This loaded voltage can never exceed the unloaded or Open Circuit Voltage (OCV) of −0.7-0.8V and approaches this ceiling asymptotically with increasing anode area S. Thus, there is an anode size S* beyond which lies diminishing return on MFC voltage with anode area expansion. At, or below S*, there will be target operating anode area $S_o$ which can yield the desired operating voltage $V_o$. FIG. 4C shows that the target operating voltage $V_o$ is sensitive to the anode area S. The processor 16 may be configured to monitor the anode area S and to reconfigure the electrical connections of the MFC 10 to dynamically resize the anode area S to maintain the target operating anode area $S_o$, which yields the target voltage $V_o$. The processor 16 may be configured to maintain the target anode area $S_o$ at, or just below, S*, even as S* changes with dynamic environmental conditions. The processor is configured to evaluate and monitor S* as it changes over time.

Figure 5A:
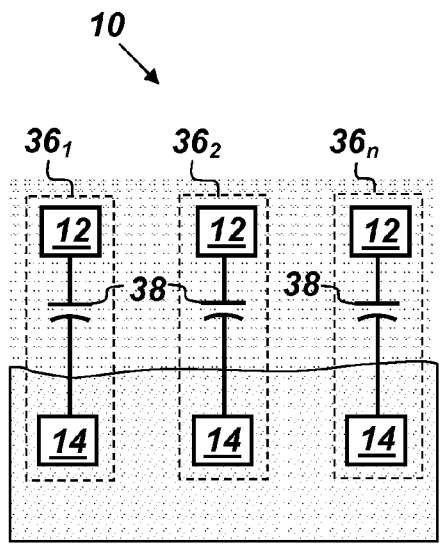
FIGS. 5A-5B are illustrations of an embodiment of the reconfigurable MFC.
Figure 5B:
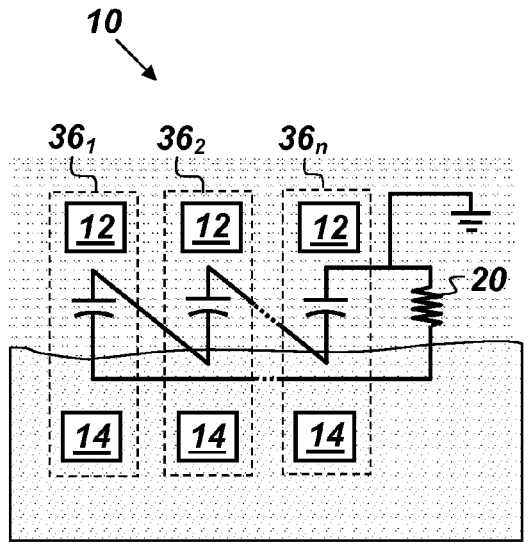

FIGS. 5A-5B illustrate another embodiment of the MFC 10 wherein each element 36 comprises an anode 14, a cathode 12, and a capacitor 38. In this embodiment, the processor 16 is configured to resize and reconfigure the MFC 10 elements $36_1$ through $36_n$ for transient capacitor charging and intermittent energy bursts across the electrical load 20. Subdividing the MFC 10 into an array of smaller discrete elements 36 enables intermittent energy capture through capacitor charging. Just as an anode 14 can be subdivided into smaller elements to control steady state voltage and power generation, the MFC 10 is capable of autonomous reconfiguration of MFC elements 36 to enable capacitor 38 charging in parallel, as shown in FIG. 5A, followed by capacitor 38 discharging in series, as shown in FIG. 5B, for transient power bursts.

Figure 5C:
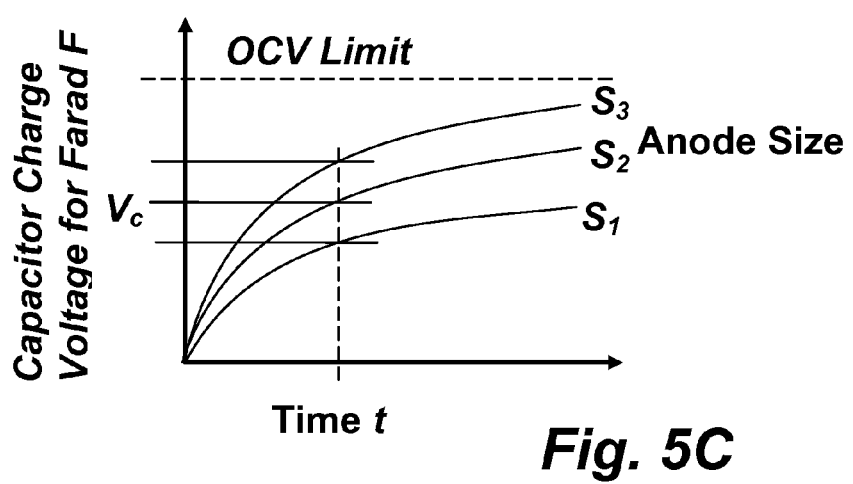
FIG. 5C is a plot of a Capacitor Charge Voltage over time with respect to three different values of the total anode area of a reconfigurable MFC.

FIG. 5C is a plot of a Capacitor Charge Voltage $V_c$ over time with respect to three different values ($S_1$, $S_2$, and $S_3$) of the total anode area of the MFC 10. As shown in FIGS. 5A-5B, capacitors 38 may be used by MFC 10 to capture and then to disburse energy intermittently. Capacitor voltage $V_c$ is dependent on: anode size S, charge time t, capacitance F and unsteady mass transport (accumulation) of the microbial species at the anodes during capacitor discharge and charging. The MFC 10 is configured to autonomously adapt to changes in the aforementioned variables. FIG. 5A illustrates that MFC energy capture becomes far more complex in this transient mode as a much larger parameter set is in play (e.g. anode size, capacitor charge time and capacitance, unsteady microbial mass transport).

Figure 6A:
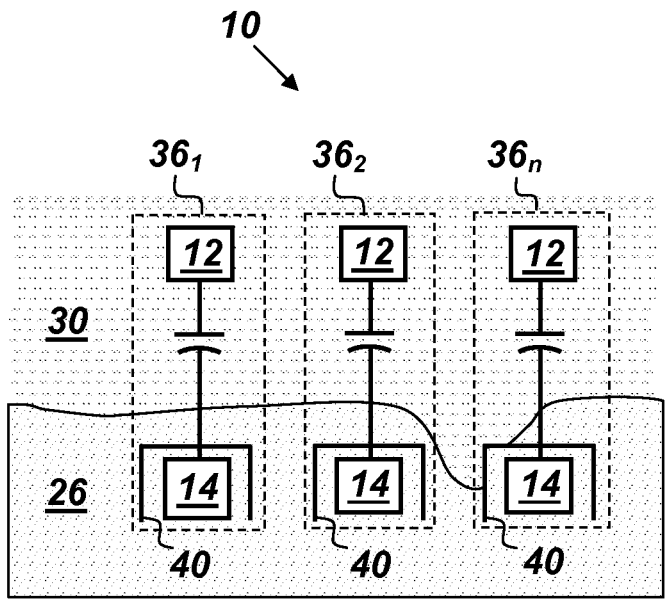
FIGS. 6A-6B are illustrations of an embodiment of the reconfigurable MFC.
Figure 6B:
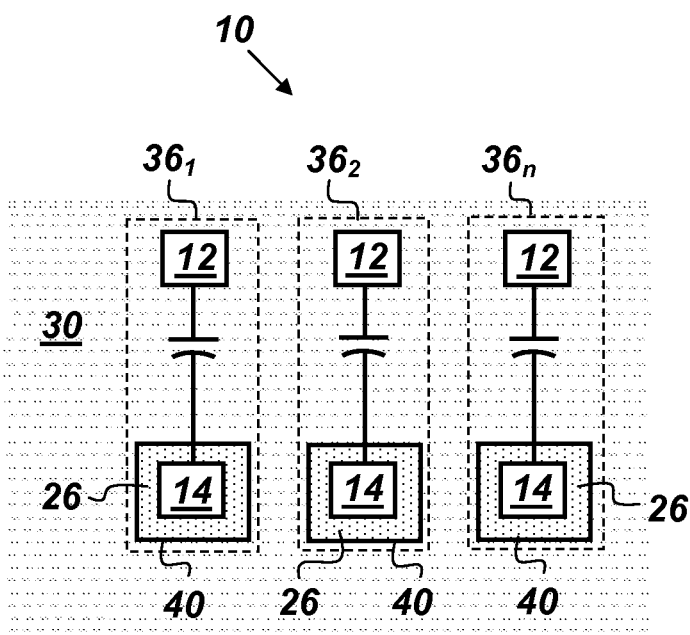

FIGS. 6A and 6B illustrate alternative embodiments of the MFC 10. In FIG. 6A, each element 36 further comprises an oxygen barrier 40. The oxygen barriers 40 are configured to reduce exposure of each anode 14 to oxygen. The oxygen barriers 40 may be any desired size and shape and be made of any material that is oxygen-impermeable. Suitable examples of oxygen-impermeable materials include, but are not limited to glass, plastic, rubber, fiberglass, and metal. For example, the oxygen barrier 40 may be an open container positioned in the low-oxygen environment such that the open container's opening faces away from the oxygen-rich environment, such as is shown in FIG. 6A. In another embodiment, the oxygen barrier 40 may be a sealed container which houses the anode 14 and the low-oxygen, microbial environment, such as is shown in FIG. 6B.

Figure 7:
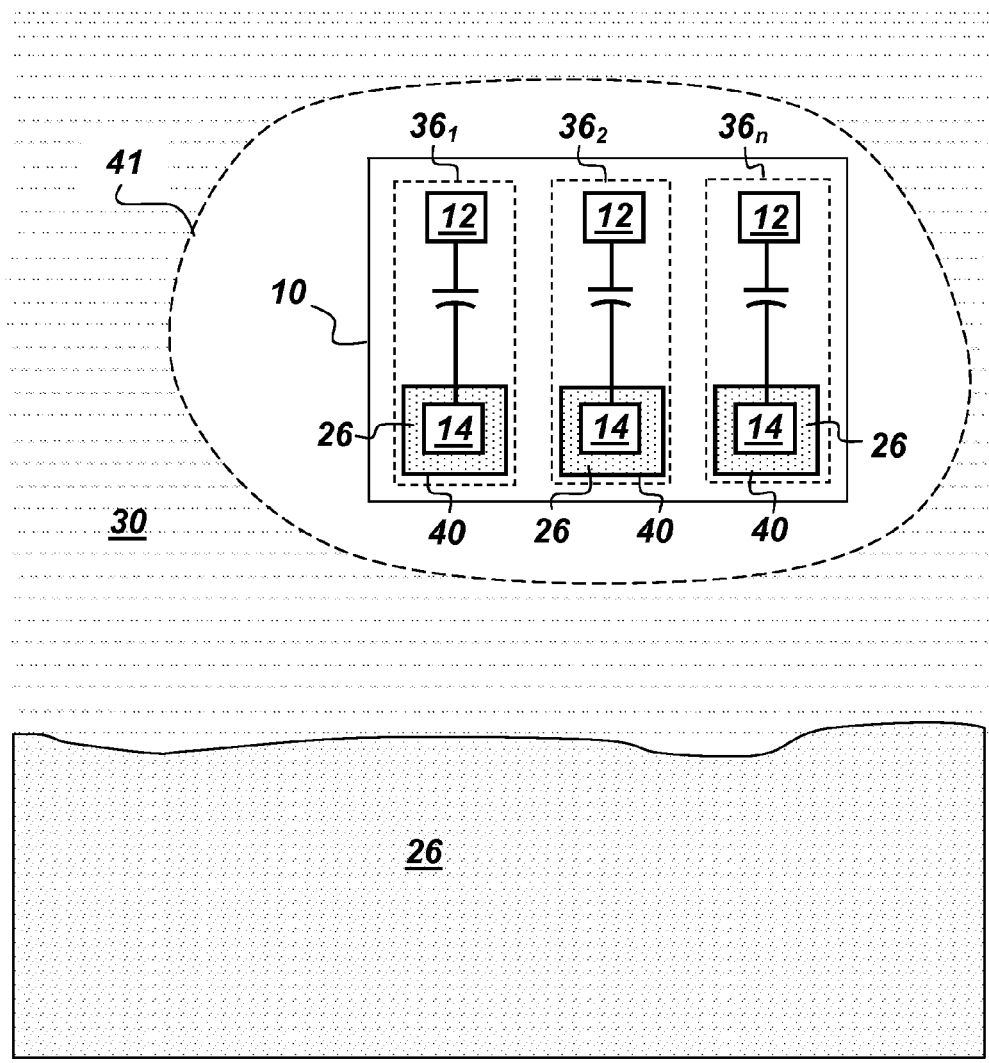
FIG. 7 is an illustration of the embodiment of the reconfigurable MFC shown in FIG. 6B mounted to a vehicle.

FIG. 7 illustrates the sealed barrier embodiment of the MFC 10 shown in FIG. 6B mounted to a vehicle 41. The vehicle 41 may be any vehicle designed to operate in the same environment as the MFC 10. For example, the vehicle 41 may be designed to move through the water 30, rest on/in the sea-bed sediment 26, etcetera. The MFC 10 of FIG. 6B may be mounted on the interior and/or the exterior of the vehicle 41 and further configured to provide power to the vehicle 41 and/or to onboard sensors.

Figure 8:
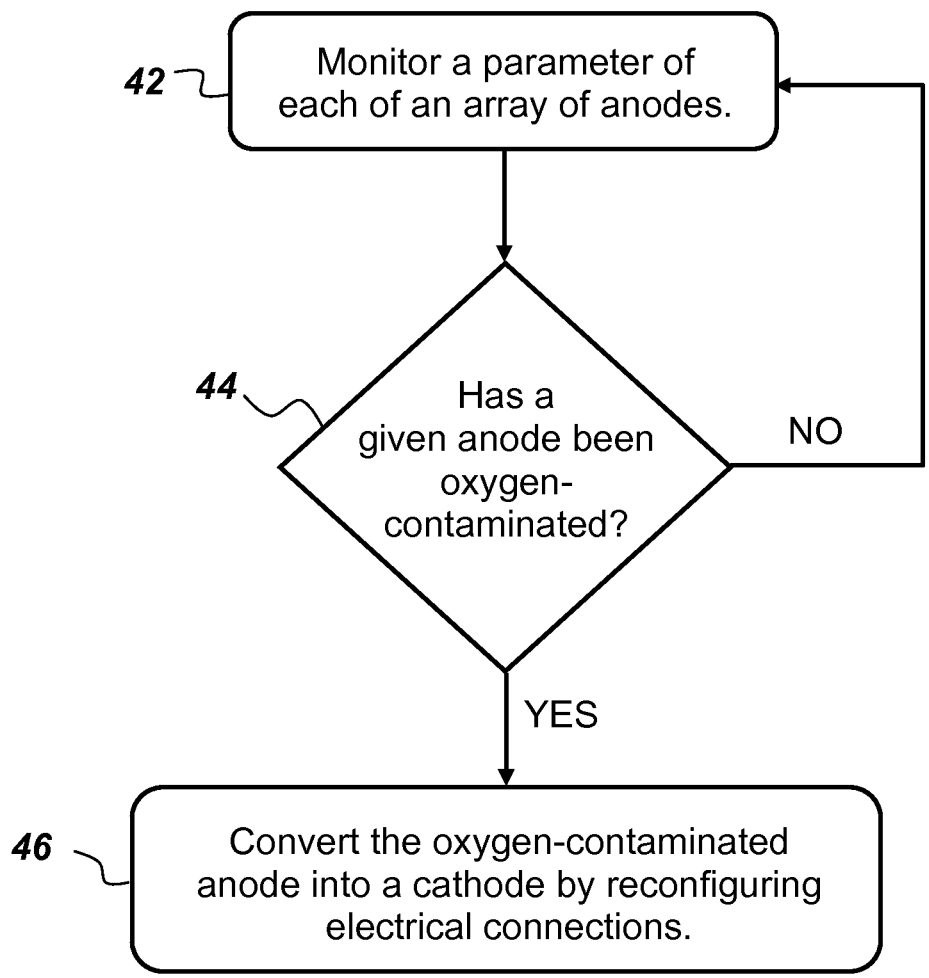
FIG. 8 is a flowchart showing the operation of the reconfigurable MFC.

FIG. 8 is a flowchart showing how the processor 16 may be used to control the power output from the MFC 10. The first step 42 provides for monitoring a parameter of each of an array of anodes 14. The second step 44 provides for determining if a given anode 14 has been oxygen-contaminated. The third step 46 provides for converting the oxygen-contaminated anode into a cathode 12 by reconfiguring the electrical connections. The steps of monitoring, determining, and converting may be performed by the processor 16.

Figure 9:
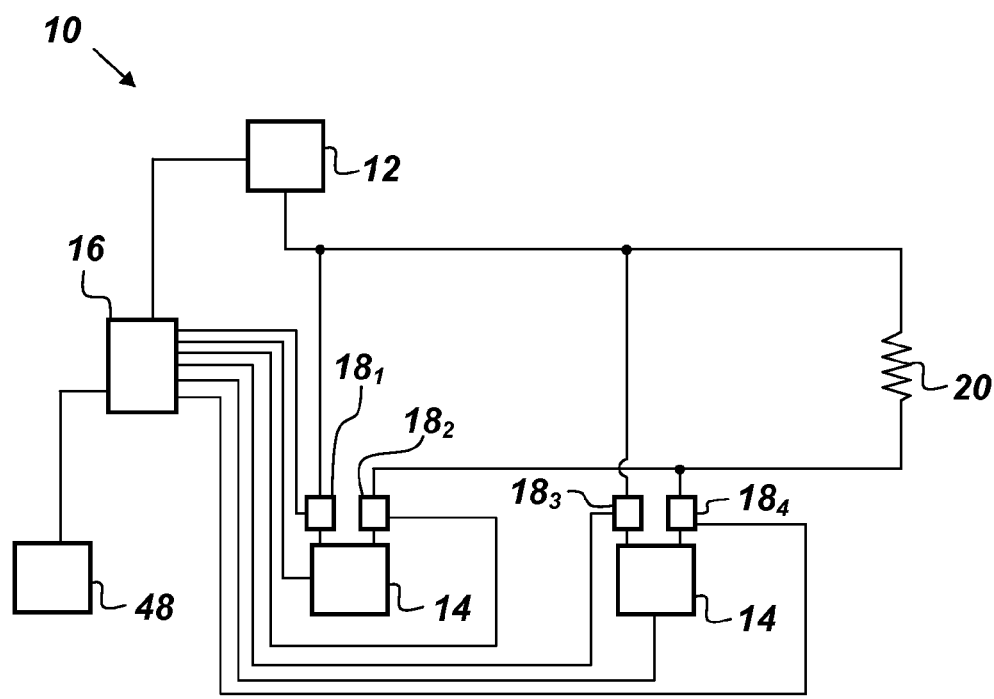
FIG. 9 is an illustration of an embodiment of the reconfigurable MFC.

FIG. 9 portrays an embodiment of the reconfigurable MFC 10 further comprising a reference electrode 48 operatively coupled to the processor 16. In this embodiment, the processor 16 is configured to monitor a parameter of each anode 14 relative to the reference electrode 48 to determine if a given anode 14 has been oxygen-contaminated. Alternatively, the processor 16 may be configured to monitor a parameter of each anode 14 relative to the cathode 12 to determine if a given anode 14 has been oxygen-contaminated. Thus, FIG. 9 also shows the option of operatively coupling the cathode 12 to the processor 16. In this embodiment, the parameter monitored by the processor 16 may be any performance characteristic of an anode as measured against the reference electrode 48 and/or the cathode 12.

From the above description of the MFC 10, it is manifest that various techniques may be used for implementing the concepts disclosed herein without departing from the scope of the MFC 10. The described embodiments are to be considered in all respects as illustrative and not restrictive. It should also be understood that the MFC 10 is not limited to the particular embodiments described herein, but is capable of many embodiments without departing from the scope of the claims.

We claim:

1. A microbial fuel cell comprising:
a first cathode;
a load electrically connected to the first cathode;
at least two anodes, wherein each anode is electrically connected, via processor-controlled switches, to the load and to the first cathode in a reconfigurable manner such that any of the anodes may be converted into cathodes;
at least two oxygen barriers, one for each anode, wherein each oxygen barrier is an open container containing a portion of the sediment and a respective anode, and wherein each container is buried in the sediment such that the open container's opening faces away from the sea water; and
a processor operatively coupled to the anodes and configured to monitor a voltage output by each anode as compared to a reference electrode to determine if any anode has been oxygen-contaminated, and further configured to open the processor-controlled switch that connects a given oxygen-contaminated anode to the load and to close the processor-controlled switch that connects the given oxygen-contaminated anode to the first cathode in order to convert the given oxygen-contaminated anode into a second cathode, wherein the fuel cell operates in an oceanic environment, and wherein the anodes are buried in sea-bed sediment, and the cathode is positioned in seawater.

2. The fuel cell of claim 1, further comprising an array of discreet elements, each element comprising a cathode, an electrical load, and an anode, wherein the elements and the components within each element are electrically connected via, processor-controlled switches, wherein the processor is configured to convert any given oxygen-contaminated anode from any given element into an additional cathode.

3. The fuel cell of claim 2, wherein the processor is configured to dynamically reconfigure the electrical connections to achieve a desired anode-operating size $S_o$ such that the fuel cell yields a desired operating voltage $V_o$.

4. The fuel cell of claim 2, wherein each element further comprises a Capacitor, wherein the processor is configured to reconfigure the electrical connections to allow the capacitors to be charged in parallel and subsequently discharged in series.

5. A microbial fuel cell comprising:
an array of discreet elements, each element comprising a cathode, an electrical load, and an anode, wherein the cathodes are positioned in a first environment and wherein the elements and the components within each element are electrically connected via processor-controlled switches, wherein each anode is electrically connected, via processor-controlled switches, to the respective load and to the respective cathode in a reconfigurable manner such that any of the anodes may be converted into additional cathodes;

an array of oxygen barriers, one for each anode, wherein each oxygen barrier is a sealed container containing a portion of sediment and a respective anode, wherein the sediment has a lower concentration of oxygen than the first environment;

a processor operatively coupled to the anodes and configured to monitor a voltage output by each anode as compared to a reference electrode to determine if any anode from any given element has been oxygen-contaminated, and further configured to open the processor-controlled switch that connects a given oxygen-contaminated anode to the respective load and to close the processor-controlled switch that connects the given oxygen-contaminated anode to the respective cathode in order to convert the given oxygen-contaminated anode into an additional cathode, wherein the fuel cell operates in an oceanic environment, and wherein the first environment is seawater.

6. The fuel cell of claim 5, wherein the fuel cell is mounted to a mobile vehicle, such that each cathode is positioned outside the sealed containers.

7. A method for controlling power output from a microbial fuel cell comprising the following steps:

monitoring, with a processor that is operatively coupled to each anode of an array of anodes, a parameter of each anode as compared to a reference electrode;

determining, with the processor, if any given anode has been oxygen-contaminated; and converting the oxygen-contaminated anode into an additional cathode by opening, with the processor, a processor-controlled switch that connects the given oxygen-contaminated anode to a respective load and closing, with the processor, a processor-controlled switch that connects the given oxygen-contaminated anode to a respective cathode, wherein the anodes are surrounded by sea-bed sediment and the cathode is surrounded by seawater.

8. The method of claim 7, wherein the parameter monitored by the processor is a voltage output by each of the array of anodes.

9. The method of claim 7, wherein the steps monitoring, determining, and converting are performed without any human involvement.

10. The method of claim 9, further comprising the steps of positioning each anode in an oxygen-impermeable, open container that contains a portion of the sea-bed sediment, and burying each container in the sea-bed sediment such that the open container's opening faces away from the sea water.

11. The method of claim 10, further comprising the step of dynamically reconfiguring the electrical connections in response to changing environmental conditions to maintain a desired anode-operating size $S_o$ such that the fuel cell yields a desired operating voltage $V_o$.

12. The method of claim 7, further comprising the step of reconfiguring the electrical connections to allow capacitors within the microbial fuel cell to be charged in parallel and subsequently discharged in series.

13. The method of claim 7, further comprising the steps of reducing anode exposure to oxygen by shielding each anode within a corresponding oxygen barrier in the form of a sealed container that contains an anaerobic medium, and mounting the microbial fuel cell to a vehicle capable of moving through water such that the cathode is positioned outside the container.

* * * * *